US008142899B2

(12) United States Patent
Yoshino

(10) Patent No.: US 8,142,899 B2
(45) Date of Patent: Mar. 27, 2012

(54) HEAT-RESISTANT RESIN COMPOSITION, METHOD OF PRODUCING THE SAME, HEAT-RESISTANT RESIN-MOLDED ARTICLE, AND SURFACE MOUNT ELECTRONIC COMPONENT

(75) Inventor: Yasuyuki Yoshino, Chiba (JP)

(73) Assignee: DIC Corporation, Tokyo (JP)

( * ) Notice: Subject to any disclaimer, the term of this patent is extended or adjusted under 35 U.S.C. 154(b) by 943 days.

(21) Appl. No.: 12/159,571

(22) PCT Filed: Dec. 26, 2006

(86) PCT No.: PCT/JP2006/325932

§ 371 (c)(1),
(2), (4) Date: Jun. 27, 2008

(87) PCT Pub. No.: WO2007/077831

PCT Pub. Date: Jul. 12, 2007

(65) Prior Publication Data

US 2009/0181234 A1    Jul. 16, 2009

(30) Foreign Application Priority Data

Dec. 28, 2005    (JP) .................................. 2005-378130

(51) Int. Cl.
*B32B 27/34* (2006.01)
*B32B 27/08* (2006.01)
*B32B 5/16* (2006.01)
*B29B 7/48* (2006.01)
*C08J 3/18* (2006.01)

(52) U.S. Cl. ...... 428/474.4; 366/76.4; 366/79; 428/327; 516/99; 516/104; 525/389; 525/394; 525/534; 525/535

(58) Field of Classification Search ............... 428/474.4, 428/327; 366/76.4, 79; 516/99, 104; 525/389, 525/394, 534, 535
See application file for complete search history.

(56) References Cited

U.S. PATENT DOCUMENTS

| 5,635,558 A | 6/1997 | Chen et al. |
| 5,811,492 A | 9/1998 | Mori et al. |
| 6,528,558 B2 | 3/2003 | Lewin |
| 6,875,812 B1 | 4/2005 | Akiyama et al. |
| 7,098,273 B2 | 8/2006 | Yamada et al. |
| 2002/0013393 A1 | 1/2002 | Lewin |
| 2004/0266956 A1 | 12/2004 | Yamada et al. |

FOREIGN PATENT DOCUMENTS

| CN | 1205020 A | 1/1999 |
| DE | 41 19 299 A1 | 12/1992 |
| DE | 103 34 049 A1 | 3/2004 |
| EP | 0 463 738 A2 | 1/1992 |
| EP | 0523326 A1 | 1/1993 |
| EP | 0852249 | 7/1998 |
| EP | 1 081 183 A2 | 3/2001 |
| EP | 1 491 587 A2 | 12/2004 |
| JP | 02123159 | 5/1990 |
| JP | 02218754 | 8/1990 |
| JP | 04159366 | 6/1992 |
| JP | 05005060 | 1/1993 |
| KR | 1020000064264 A | 11/2000 |
| WO | 9803590 | 1/1998 |
| WO | WO-99/32565 A2 | 7/1999 |

OTHER PUBLICATIONS

International Search Report for PCT/JP2006/325932.*
European Search Report for EP 06 84 3316.*
First Office Action for Chinese Application 2006800493591.*
Notice of Allowance for Korean Application 1020000064264.*
Notice of Allowance for Patent from the Korean Intellectual Property Office, Application 10-2008-7015188, Jun. 23, 2010.*

* cited by examiner

*Primary Examiner* — Timothy J. Kugel
(74) *Attorney, Agent, or Firm* — McDermott Will & Emery LLP

(57) ABSTRACT

To provide a heat-resistant resin composition which has excellent heat resistance, does not show a reduced mechanical strength such as flexural strength even after being passed rough a reflow furnace and heat-treated under high temperature conditions, and also has an excellent flame retardancy; a production method of the heat-resistant resin composition; a heat-resistant resin-molded article; and a surface mount electronic component. The heat-resistant resin composition includes a polyarylene sulfide resin (A) and an aromatic polyamide (B) having terephthalic acid amide as an essential structural unit at a former/latter ratio of 70/30 to 95/5 by mass. In a molded article composed of the heat-resistant resin composition, the average diameter of holes formed by etching a broken-out section of the molded article with an organic solvent is 0.1 to 1.0 μm, where the broken-out section is observed on a scanning electron microscope (2,500 times).

12 Claims, 4 Drawing Sheets

HEAT-RESISTANT RESIN COMPOSITION, METHOD OF PRODUCING THE SAME, HEAT-RESISTANT RESIN-MOLDED ARTICLE, AND SURFACE MOUNT ELECTRONIC COMPONENT

CROSS-REFERENCE TO PRIOR APPLICATION

This is a U.S. National Phase Application under 35 U.S.C. §371 of International Patent Application No. PCT/JP2006/325932 filed Dec. 26, 2006, which claims the benefit of Japanese Application No. 2005-378130 filed Dec. 28, 2005, both of them are incorporated by reference herein. The International Application was published in Japanese on Jul. 12, 2007 as WO 2007/077831 A1 under PCT Article 21(2).

TECHNICAL FIELD

The present invention relates to a resin composition containing a polyarylene sulfide resin and an aromatic polyamide resin, a production method of the resin composition, a heat-resistant resin-molded article, and a surface mount electronic component.

BACKGROUND ART

Since a polyarylene sulfide resin, which is represented by a polyphenylene sulfide resin, has a high melting point excellent flame retardancy and chemical resistance, and good fluidity during molding, the polyarylene sulfide resin is widely used in various electronic components, mechanical parts or automobile parts as an engineering plastic for injection molding.

Recently, in the electric or electronic industry field, with maturization of products or improvement of productivity, a method of mounting a resin-based electronic component on a printed board is performed by a so-called surface mount method (hereinafter, abbreviated to an "SMT method"). In a technology of mounting an electronic component on a board by the SMT method, tin-lead eutectic solder (melting point of 184° C.) had been generally used in the past. However, recently, lead-free solder obtained by adding various types of metal to tin as a base material has been used in place of the conventional solder, due to environmental contamination.

Since the lead-free solder has a higher melting point than that of the tin-lead eutectic solder; for example, tin-silver eutectic solder has a melting point of 220° C., the temperature of a heating furnace (reflow furnace) has to be further increased at the time of surface mounting. Thus, when soldering a resin-based electronic component such as a connector, there has been a problem that the electronic component melts or deforms in the heating furnace (reflow furnace). Consequently, a high-heat-resistant resin material for a surface mount electronic component has been strongly desired.

Meanwhile, as a high-heat-resistant resin material, a resin composition obtained by melting and kneading polyarylene sulfide with aromatic polyamide has been known (for example, see Patent Document 1 and Patent Document 2). However, since the polyarylene sulfide and the aromatic polyamide generally show low compatibility, it is difficult to uniformly mix the polyarylene sulfide and the aromatic polyamide. Accordingly, a weak point of the aromatic polyamide of a low moisture absorption characteristic significantly stands out and results blistering to occur easily on the electronic component passing through the heating furnace (reflow furnace). Moreover, after the electronic component is passed through the reflow furnace, a mechanical property such as flexural strength to deteriorate. In addition to the deterioration in dispersion of polyarylene sulfide and aromatic polyamide, flame retardancy deteriorates because a large quantity of aromatic polyamide is used and thus the requirement of the electronic or electric part cannot be satisfied.

Patent Document 1: Japanese Unexamined Patent Application Publication No. H02-123159
Patent Document 2: Japanese Unexamined Patent Application Publication No. H05-5060

DISCLOSURE OF INVENTION

Accordingly, an object of the present invention is to provide a heat-resistant resin composition which has excellent heat resistance, does not show a reduced mechanical strength such as flexural strength even being heat-treated under a high temperature condition when being passed through a reflow furnace, and also has an excellent flame retardancy; a method of producing the heat-resistant resin composition; and a surface mount electronic component.

The present inventor has conducted extensive studies to solve the above-mentioned problems, and as a result, the inventor has found that when a polyarylene sulfide resin (A) and an aromatic polyamide (B) having terephthalic acid amide as an essential structural unit are blended with a predetermined ratio and the aromatic polyamide (B) is microdispersed in the polyarylene sulfide resin (A), the mechanical strength such as flexural strength does not deteriorate, the heat resistance of the aromatic polyamide (B) is excellent and flame retardancy is excellent although a heating treatment in a heating furnace (reflow furnace) is performed under a high-temperature condition when the molded article is surface-mounted on a printed board. Thus, the inventor completed the present invention.

The present invention relates to a heat-resistant resin composition containing a polyarylene sulfide resin (A) and an aromatic polyamide (B) having terephthalic acid amide as an essential structural unit at a former/latter ratio of 70/30 to 95/5 by mass, wherein the aromatic polyamide (3) is particularly dispersed in the polyarylene sulfide resin (A) as matrix and an average diameter of the particles of the aromatic polyamide (B) is in a range of 0.1 to 1.0 μm.

The present invention further relates to a production method of a heat-resistant resin composition, the method including insert a polyarylene sulfide resin (A) and an aromatic polyamide (B) having terephthalic acid amide as an essential structural unit into a twin screw extruder aid melting and beading the polyarylene sulfide resin (A) and the aromatic polyamide (B) under the condition that a ratio of an ejection quantity (kg/hr) of a resin component to a screw rotation rate (rpm) (ejection quantity/screw rotation rate) is 0.02 to 0.2 (kg/hr/rpm).

The present invention further relates to a heat-resistant resin-molded article including a heat-resistant resin composition containing a polyarylene sulfide resin (A) and an aromatic polyamide (B) having terephthalic acid amide as an essential structural unit at a former/latter ratio of 70/30 to 95/5 by mass, and when a broken-out section of a molded article composed of the heat-resistant resin composition is etched with an organic solvent and subsequently observed on a scanning electron microscope (2,500 times), an average diameter of holes formed by the etching process is in a range of 0.1 to 1.0 μm.

The preset invention flirter relates to a surface mount electronic component including a molded article of the heat-resistant resin composition and a metal terminal as an essential component.

According to the present invention, it is possible to provide a heat-resistant resin composition which has excellent heat resistance, does not show a reduced mechanical strength such as flexural strength even after being passed through a reflow furnace and heat-treated under high temperature conditions, and also has an excellent flame retardancy, a method of producing the heat-resistant resin composition, a heat-resistant resin-molded article, and a surface mount electronic component.

Accordingly, the heat-resistant resin composition of the present invention shows excellent heat resistance in a high-temperature range and, when the heat-resistant resin composition is used in the surface mount electronic component, a variation in mechanical strength and a variation in appearance of the electronic component after a soldering process are very small despite being exposed to a high temperature at the time of soldering to the substrate. Accordingly, the heat-resistant resin composition is particularly useful in a connector, a switch, a relay, a coil bobbin and a capacitor which are provided at the time of soldering to the printed board in the SMT method.

BEST MODE FOR CARRYING OUT THE INVENTION

Figure 1:
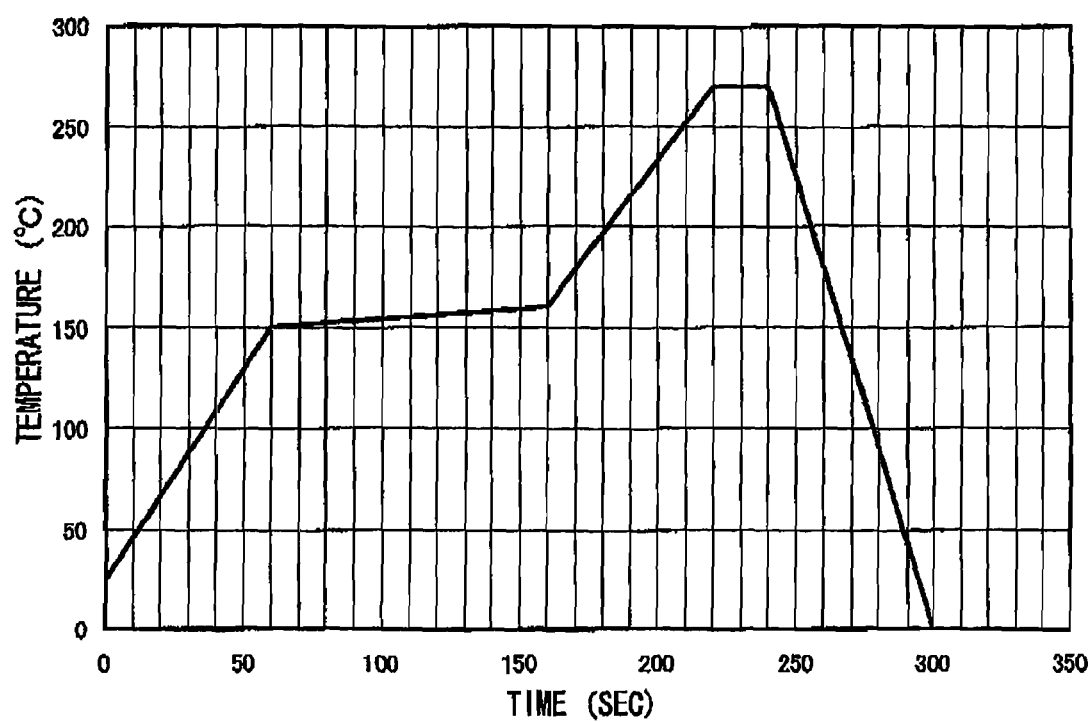
FIG. 1 is a graph showing a temperature profile in an infrared heating furnace in a blister-resistant test B.

A heat-resistant resin composition of the present invention includes, as mentioned above, a polyarylene sulfide resin (A) and an aromatic polyamide (B) having terephthalic acid amide as an essential structural unit at a former/latter ratio in a range of 70/30 to 95/5 by mass. If the content of the aromatic polyamide (B) is greater than the range, the dispersion of the aromatic polyamide (B) deteriorates, flame retardancy deteriorates, moisture resistance deteriorates, and strength after a reflow process deteriorates. In contrast if the content of the aromatic polyamide (B) is less than the range, the improvement of the heat resistance is insufficient. Accordingly, the ratio is particularly preferably in the range of from 80/20 to 95/s by mass from the viewpoints of providing excellent flame retardancy, mechanical strength after the reflow process and heat resistance.

In the heat-resistant resin of the present invention, as described above, the aromatic polyamide (B) is particulately dispersed in the polyarylene sulfide resin (A) as a matrix and the average diameter of the particles of the aromatic polyamide (B) is in a range of 0.1 to 1.0 μm. By micro-dispersing a predetermined amount of the aromatic polyamide (B) in the polyarylene sulfide resin (A) as a matrix, excellent heat resistance provided by the aromatic polyamide (B) can be exhibited without deteriorating the flame retardancy provided by the polyarylene sulfide resin (A). In particular, the fact of exhibiting a specific performance of giving excellent mechanical strength such as flexural strength after being passed through a reflow furnace under a high-temperature condition while maintaining excellent flame retardancy is worthy of special mention.

The average diameter of the particles of the aromatic polyamide (B) can be obtained by calculating an average diameter of holes formed by etching a broken-out section of the molded article composed of the heat-resistant resin composition with an organic solvent and considering the average diameter of the holes as the above-mentioned average diameter of the particles, when the broken-out section is observed on a scanning electron microscope (2,500 times).

That is, the hole on the broken-out section after the etching process is a hole-shaped void which appear by removal of particles of the aromatic polyamide (B) dispersed in the polyarylene sulfide resin (A) as a matrix and the diameter of the hole is equal to the diameter of particles of the aromatic polyamide (B). Accordingly, in the present invention, an average diameter of the particles of the aromatic polyamide (B) is obtained by considering the diameters of the holes formed by the etching process as the diameters of the particles, and calculating the average thereof.

A method of forming the broken-out section of the molded article includes, for example, molding a heat-resistant resin composition into a test piece having a width of 12 mm, a length of 62.5 mm, and a thickness of 3 mm by injection molding, cooling the obtained molded article to −40 to −60° C., performing an Izod impact test based on ASTM D-256 (load: 30 kg), and forming the broken-out section.

As a method of etching the molded article, the broken-out section obtained by the above method is etched with an organic solvent which can dissolve the aromatic polyamide (B), so as to remove the aromatic polyamide (B). In detail, the broken-out section obtained by breaking out the molded article of the heat-resistant resin composition is immersed in the organic solvent and is treated by ultrasonics, and the broken-out section is cleaned with acetone and then dried. Here, the organic solvent which can be used in the etching process may be a solvent which selectively dissolves and removes the dispersion particles of the aromatic polyamide (B), such as chloroform, 2-propanol or trifluoroacetic acid. Among them, in particular, in the present invention, trifluoroacetic acid is preferable from the viewpoint of excellent solubility of the aromatic polyamide (B). In addition, the etching process may be performed under room-temperature condition to a heating condition and may be performed, for example, under the condition of a temperature between 10 and 60° C. In particular, in case of using trifluoroacetic acid as the organic solvent, a low-temperature process becomes possible and the deformation of the holes after the etching process can be avoided. In this case, specifically, it is preferable for the etching process to be performed at 15 to 30° C. The aromatic polyamide (B) is removed from the broken-out section of the etched molded article and the holes having the same diameter as that of the particle of the aromatic polyamide (B) are formed in an area where the particles of the aromatic polyamide (B), which are micro-dispersed before the etching process, exist.

The average diameter is obtained by observing two areas on the same surface of the etched broken-out section by the scanning electron microscope (2,500 times), measuring the diameters of all the holes observed in a range of 2,600 μm² per area, and obtain the average of diameters of the holes in the two areas, that is, all the holes observed in a range of 5,200 μm². Here, the measurement of diameters of the holes may be performed by magnifying the scanning electron micrograph photographed at 2,500 times to an A3 size and using a graphic digitizer such as product "KD4600" manufactured by GRAPHTEC Corporation.

The calculated average diameter of the holes is equal to the average diameter of the particles of the aromatic polyamide (B) and is in a range of from 0.1 to 1.0 μm. In the present invention, if the average diameter is greater than the above range, sufficient flame retardancy can not be obtained due to the deterioration of morphology and the mechanical strength deteriorates after the reflow process. In contrast, if the quantity of aromatic polyamide (B) is insufficient, the average diameter becomes less than the above range and sufficient heat resistance cannot be obtained. Accordingly, it is preferable that the average diameter of the holes be 0.1 to 0.6 μm, in view of excellent performance balance.

The polyarylene sulfide resin (A) (hereinafter, abbreviated to the "PAS resin (A)") used in the present invention has a resin structure having a structure in which an aromatic ring and a sulfur atom are bonded as a repeating unit and, in more detail, is a resin having the structure represented by the following Structural Formula 1 as the repeating unit,

[Chemical Formula 1]

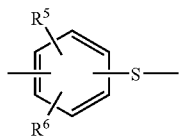

Structural Formula 1 wherein, $R^5$ and $R^6$ each independently represents a hydrogen atom, an alkyl group having 1 to 4 carbon atom(s), a nitro group, an ammo group, a phenyl group, a methoxy group, or an ethoxy group.

Here, in the structure represented by Structural Formula 1, in particular, it is preferable that $R^5$ and $R^6$ in the formula be a hydrogen atom in view of the mechanical strength of the PAS resin (A), for example, the structure having a sulfur atom bonded at the para-position of aromatic ring represented by Structural Formula 2 or the structure having a sulfur atom bonded at meta-position represented by Structural Formula 3.

[Chemical Formula 2]

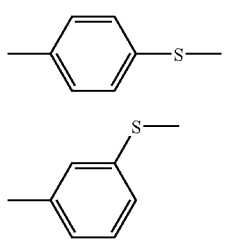

Structural Formula 2

Structural Formula 3

Among them, it is preferable that the structure having the bond of the sulfur atom and the aromatic ring as the repeating units be the structure that the sulfur atom is bonded at the para-position of the aromatic ring represented by Structural Formula 2, in view of heat resistance or crystalline of the PAS resin (A).

The PAS resin (A) may include not only the structure represented by the strop Formula 1, but also a stroke represented by the following Structural Formulas 4 to 7,

[Chemical Formula 3]

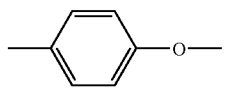

Structural Formula 4

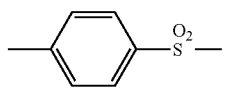

Structural Formula 5

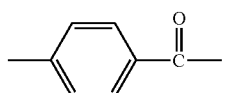

Structural Formula 6

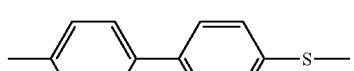

Structural Formula 7 and their total content in the PAS resin (A) is 30% by mole or less. In particular, in the present invention, it is preferable that the structures expressed by Structural Formulas 4 to 7 be 10% by mole or less, in view of the heat resistance and the mechanical strength of the PAS resin (A). When the structures represented by Structural Formulas 4 to 7 are included in the PAS resin (A), the bonding mode thereof may be any of a random copolymer and a block copolymer.

The PAS resin (A) may have a trifunctional structure represented by the following Structural Formula 8 or a naphthyl sulfide bond, however, the ratio of the molar number of the structures to the total molar number including that of other structures is preferably 3% by mole or less and more preferably 1% by mole or less.

[Chemical Formula 4]

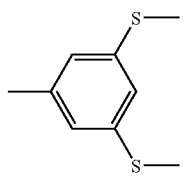

Structural Formula 8

The PAS resin (A) can be, for example, produced by the following methods (1) to (3):

(1) a method of reacting sodium sulfide and p-dichlorobenzene in a sulfone— based solvent such as sulfolane or an amide-based solvent such as N-methylpyrrolidone or dimethylacetamide, (2) a method of polymerizing p-dichlorobenzene in the presence of sulfur and sodium carbonate, (3) a method of self-condensation of p-chlorobenzene.

Among them, the method (1) of reacting sodium sulfide and p-dichlorobenzene in an amide-based solvent such as N-methylpyrrolidone or dimethylacetamide or a sulfone-based solvent such as sulfolane is preferable in view of excellent industrial productivity and the facilitation of the reaction control. Here, in the method (1), either commercially available sodium sulfide may be used, or alternatively sodium hydrosulfide is reacted with sodium hydroxide or hydrogen sulfide is reacted with sodium hydroxide in an amide-based solvent or a sulfone-based solvent, to produce sodium sulfide, and subsequently p-dichlorobenzene is added in the reaction system to perform polymerization. In addition, in the method (1), when reacting sodium sulfide with p-dichlorobenzene, it is preferable to add alkali metal gaits of carboxylic acid or sulfonic acid, or alkali hydroxide in order to adjust the polymerization degree.

In the PAS resin (A), a linear polyarylene sulfide resin having a substantially linear structure is preferable in that the mechanical strength of the molded article and the dispersing ability of the aromatic polyamide (B) are excellent and the heat resistance of the molded article is significantly improved. In detail, a non-Newtonian index is preferably from 1.3 to 0.9 and more preferably from 1.2 to 1.0.

Here, the non-Newtonian index is a value obtained by calculating a slope of the logarithmic plot of a shearing stress vs. a shearing rate in a range of 100 to 1000 (sec$^{-1}$) which are obtained by the measurement using dice having a diameter of 1 mm and a length of 40 mm under the condition of a temperature of 300° C. by filling the PAS resin (A) into a Capillary Rheometer.

The melt flow rate of the PAS resin (A) is preferably 1 to 3,000 g/10 min and more preferably 10 to 1,500 g/10 min, in view of compatibility with the aromatic polyamide (B). In addition, the melt flow rate is a value measured under 316° C./5000 g load (orifice: a diameter of 0.0825±0.002 inches×a length of 0.315±0.001 inches) conditions according to ASTM D1238-86.

In the PAS resin (A), it is preferable that the viscosity is adjusted by blending a small quantity of branched polyarylene sulfide resin having a multibranched structure represented by Structural Formula 8 into the linear polyarylene sulfide resin, from the viewpoint of improving moldability by controlling the occurrence of burring. In this case, it is preferable that the non-Newtonian index is 1.3 to 0.9 in the mixed state and the melt flow rate is 10 to 1500 g/10 min.

Here, the linear polyarylene sulfide resin described above is obtained by, for example, a method including adding p-dihalogenbenzene into a mixture of alkali metal sulfide or alkali metal persulfide, alkali metal carboxylate such as sodium acetate trihydrate and organic amide, and then reacting the mixture.

The PAS resin (A) is preferably treated with acid and then cleaned with water after the production of the PAS resin (A), from the viewpoints of improving moisture resistance by reducing the quantity of residual metal ion and reducing the residual quantity of low-molecular impurities which are byproducts from the polymerization.

As the acid which can be used therein, acetic acid, hydrochloric acid, sulfinic acid, phosphoric acid, silicate, carbonic acid or propylic acid is preferable from the point that the residual metal ion quantity can be efficiently reduced without decomposing the PAS resin (A). Among them, acetic acid or hydrochloric acid is preferable.

The acid treatment method may include a method of immersing the PAS resin in an acid or acid aqueous solution. At this time, as necessary, agitation or heating treatment may be performed.

Here, the detailed acid treatment method may include a method of heating an acid aqueous solution of pH 4 at 80 to 90° C., immersing the PAS resin (A) in the solution, and agitating the solution for 20 to 40 min, in the case where acetic acid is used.

The PAS resin (A) which is treated with acid in this manner is subsequently cleaned with water or warm water several times in order to physically remove residual acid or salt. As the water used at this time, distilled water or deionized water is preferable.

The PAS resin (A) which is treated with acid is preferably a powder or a granule in detail, a granule such as pellet or a slurry after polymerization.

Next, the aromatic polyamide (B) used in the present invention has terephthalic acid amide in a molecular structure as an essential structural unit. In the present invention, since the aromatic polyamide (B) has terephthalic acid amide as the essential structural unit excellent heat resistance and mechanical strength may be applied to the heat-resistant resin composition due to the rigid molecular structure.

Here, the terephthalic acid amide structure which is the essential structural unit of the aromatic polyamide (B) may include the structure represented by the following Structural Formula a.

[Chemical Formula 5]

Structural Formula a

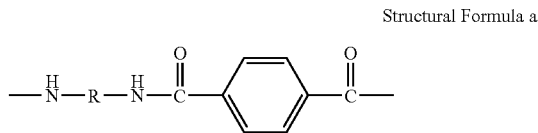

In Structural Formula a, R represents an alkylene group having 2 to 12 carbon atoms. The terephthalic acid amide structure is formed by reacting terephthalic acid or terephthalate dihalide with aliphatic diamine having 2 to 12 carbon atoms. Examples of the aliphatic diamine having 2 to 12 carbon atoms used here may include linear aliphatic alkylenediamine such as ethylenediamine, propanediamine, 1,4-butanediamine, 1,6-hexanediamine, 1,7-heptmediamine, 1,8-octanediamine, 1,9-nonanediamine, 1,10-decanediamine, 1,11-undecanediamine, and 1,12-dodecanediamine; branched aliphatic alkylenediamine such as 1-butyl-1,2-ethanediamine, 1,1-dimethyl-1,4-butanediamine, 1-ethyl-1,4-butamediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and 5-methyl-1,9-nonanediamine; and cycloaliphatic diamine such as cyclohexanediamine, methylcyclohexanediamine, isophoronediamine, norbornanadimelhylamine, and tricyclodecanedimethylamine.

Among them, the linear aliphatic alkylenediamine having 4 to 8 carbon atoms and the branched-chain aliphatic alkylenediamine having 5 to 10 carbon atoms are preferable in view of the moisture resistance and the mechanical strength.

The aromatic polyamide (B) preferably has an isophthalic acid amide structure represented by the following Structural Formula b:

[Chemical Formula 6]

Structural Formula b

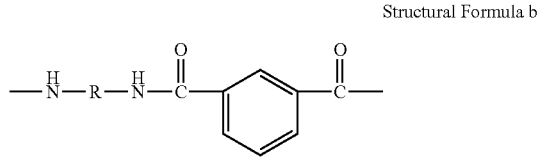

wherein R is equal to R of Structural Formula a, from the point of improving the compatibility with the PAS resin (A) by lowering a melting point of the aromatic polyamide (B).

The aromatic polyamide (B) preferably has an acid amide structure represented by the following Structural Formula c in addition to the terephthalic acid amide structure,

[Chemical Formula 7]

Structural Formula c

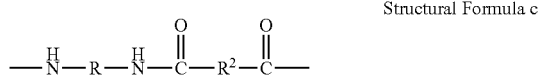

wherein R is equal to R of Structural Formula a and $R^2$ represents an aromatic hydrocarbon group other than terephthalate or isophthalate, or an aliphatic hydrocarbon group having 4 to 10 carbon atoms.

Here, the acid amide structure represented by Structural Formula c is formed by reacting aromatic dicarboxylic acid other than terephthalic acid or isophthalic acid, or aliphatic dicarboxylic acid having 4 to 10 carbon atoms; acid ester; acid anhydride; or acid halide thereof, with aliphatic diamine having 2 to 12 carbon atoms. Examples of the aromatic dicarboxylic acid other than terephthalic acid or isophthalic acid used herein may include dicarboxylic acids such as phthalic acid, naphthalenedicarboxylic acid, 9-oxofluorenedicarboxylic acid, anthracenedicarboxylic acid, anthraquinonedicarboxylic acid, biphenylenedicarboxylic acid, terphenyldicarboxylic acid, quaterphenyldicarboxylic acid, and azobenzenedicarboxylic acid.

Examples of the aliphatic dicarboxylic acid having 4 to 10 carbon atoms may include aliphatic dicarboxylic acids such as malonic acid, dimethylmalonic acid, succinic acid, glutar acid, adipic acid, 2-methyladipic acid, trimethyladipic acid, pimelic acid, 2,2-diethylglutar acid, 3,3-diethylsuccinic acid, azelaic acid, sebacic acid, and suberic acid; and cycloaliphatic dicarboxylic acid such as 1,3-cyclopentanedicarboxylic acid and 1,4-cyclohexanedicarboxylic acid.

Specific examples of the acid ester of aromatic dicarboxylic acid other than terephthalic acid or isophthalic acid, or the aliphatic dicarboxylic acid having 4 to 10 carbon atoms may include a methylester body, an ethylester body, and a t-butylester body, and specific examples of a halogen atom constituting acid halide of the above-mentioned aromatic dicarboxylic acid or the above-mentioned aliphatic dicarboxylic acid may be a bromine atom or a chlorine atom.

The aromatic polyamide (B) has terephthalic acid amide represented by Structural Formula a as an essential structure as described above, but the content of terephthalic acid amide in the aromatic polyamide (B) is preferably 65% by mole or more to the total number of moles of dicarboxylic acid residue constituting the aromatic polyamide (B) from the point of the improvement of heat resistance. Here, the dicarboxylic acid residue is the structure due to dicarboxylic acid used as a raw material of the aromatic polyamide (3) and the total number of moles thereof is equal to that of dicarboxylic acid fed during producing the aromatic polyamide (B).

The aromatic polyamide (B) is preferably:
polyamide (b1) composed of a terephthalic acid amide stricture represented by Structural Formula a of 65 to 95% by mole and an acid amide structure represented by Structural Formula c of 35 to 5% by mole; or
polyamide (b2) composed of a terephthalic acid amide structure represented by Structural Formula a of 65 to 75% by mole, an isophthalic acid amide structure represented by Structural Formula b of 25 to 10% by mole and an acid amide structure represented by Structural Formula c of 10 to 15% by mole, in term of balancing heat resistance and moisture resistance.

The aromatic polyamide (B) preferably has a melting point of 290 to 330° C. and Tg of 90 to 140° C. from the point of the dispersion of the PAS resin (A).

The aromatic polyamide (B) used in the present invention can, for example, be produced by the following methods (1) to (3):

(1) An interfacial polymerization method which includes dissolving an acid halide as a dicarboxylic acid component contain terephthalic acid and diamine component including aliphatic diamine having 2 to 12 carbon atoms into two solvents, respectively, which are not compatible with each other; and then mixing and agitating the two solutions in the presence of a quaternary ammonium salt of a catalyst and alkali, so as to perform a polycondensation reaction;

(2) A solution polymerization method which includes reacting a acid halide as a dicarboxylic acid component containing terephthalic acid with a diamine component including aliphatic diamine having 2 to 12 carbon atoms in an organic solvent in the presence of an alkali compound receptive to the acid such as tertiary amine; and (3) A melt polymerization method which includes reacting amide-exchanging reaction using a diesterification product as a dicarboxylic acid component containing terephthalic acid and aromatic diamine as raw materials in a melted state.

The heat-resistant resin composition of the present invention includes the PAS resin (A) and the aromatic polyamide (B) having terephthalic acid amide as an essential structural unit at a former/latter ratio of 70/30 to 95/5 by mass, as described above. In the present invention, when an epoxy-based silane coupling agent (C) is flirter included, the dispersion of the aromatic polyamide (B) is significantly improved and, when good morphology is formed, heat resistance and flame retardancy are Dyer improved.

Here, the epoxy-based silane coupling agent (C) is a silane compound having a structure in which an epoxy structure-containing group and at least two alkoxy groups to a Si atom, and the epoxy structure-contain group may include a glycidoxyalkyl group, 3,4-epoxycyclohexylalkyl group. The alkyl group included in these structures is preferably a linear alkyl group having 1 to 4 carbon atom(s) and the alkoxy group may include a methoxy group and an ethoxy group. Examples of the epoxy-based silane coupling agent (C) include γ-glycidoxypropyltrimethoxysilane, β-(3,4-epoxycyclohexyl)ethyltrimethoxysilane, γ-glycidoxypropyltriethoxysilane and epoxy-based silicone oil. The epoxy-based silicone oil may include a compound having a polyalkyleneoxy group composed of an alkoxy group having 2 to 6 carbon atoms as a repeated unit in two units to six units. In the epoxy-based silane coupling agent (C), in particular, a glycidoxyalkltrialkoxysilane compound such as γ-glycidoxypropyltrimethoxysilane or γ-glycidoxypropyltriethoxysilane is preferable in that the dispersion of the aromatic polyamide (B) is significantly improved.

The blending quantity of the epoxy-based silane coupling agent (C) is preferably 0.01 to 5 parts by mass and more preferably 0.1 to 2 parts by mass with respect to 100 parts by mass of the total quantity of the PAS resin (A) and the aromatic polyamide (B).

In the present invention, when a hydrotalcites compound (D) is further included in the components, the heat decomposition of a polymer component at the time of melting and kneading the PAS resin (A) and the aromatic polyamide (B) or at the time of the heat treatment of the molded article in the reflow furnace is suppressed. Thus, the mechanical strength and the flame retardancy are further improved and the appearance of the molded article after the heat treatment is further improved.

The hydrotalcites compound (L) used herein has hydroxide of a bivalent metal ion and a trivalent metal ion as a laminated crystal structure and an inorganic compound hang a structure including an anion between layers of the laminated crystal structure or a fired matter thereof. Examples of the bivalent metal ion constituting the hydrotalcites compound D) may include $Mg^{2+}$, $Mn^{2+}$, $Fe^{2+}$, $Co^{2+}$, $Ni^{2+}$, $Cu^{2+}$, and $Zn^{2+}$, and examples of the trivalent metal ion may include $Al^{3+}$, $Fe^{3+}$, $Cr^{3+}$, $Co^{3+}$, and $In^{3+}$, Examples of the anion $OH^-$, $F^-$, $Cl^-$, $Br^-$, $NO_3^-$, $CO_3^{2-}$, $SO_4^{2-}$, $Fe(CN)_6^{3-}$; $CH_3COO^-$; a molybdenum acid ion, a polymolybdenum acid ion, a vanadic acid ion, and a polyvanadic acid ion.

Among them, in particular, $Al^{3+}$ is preferable in the trivalent metal ion and $CO_3^{2-}$ is preferable in the anion in that the ion exchange capacity with an acid component due to the polyarylene sulfide resin (A) is excellent and the gas generation preventing effect is excellent. In more detail, for example, a compound represented by the following equation is preferable,

$$M^{2+}_{1-x}Al_x(OH)_2-(CO_3)_{x/2} mH_2O \qquad \text{Equation 1}$$

wherein, $M^{2+}$ represents the bivalent metal ion selected from a group consisting of Mg, Ca and Zn, and x and m are values satisfying $0<x<0.5$ and $0\leqq m\leqq 2$.

Examples of the compound satisfying Equation 1 may include

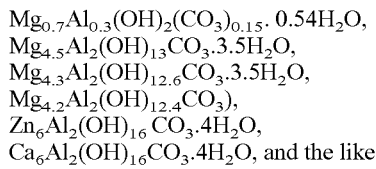

$Mg_{0.7}Al_{0.3}(OH)_2(CO_3)_{0.15} \cdot 0.54H_2O$,
$Mg_{4.5}Al_2(OH)_{13}CO_3 \cdot 3.5H_2O$,
$Mg_{4.3}Al_2(OH)_{12.6}CO_3 \cdot 3.5H_2O$,
$Mg_{4.2}Al_2(OH)_{12.4}CO_3)$,
$Zn_6Al_2(OH)_{16} CO_3 \cdot 4H_2O$,
$Ca_6Al_2(OH)_{16}CO_3 \cdot 4H_2O$, and the like, in addition to a natural hydrotalcite represented by $Mg^{2+}_6Al_2(OH)_{16} \cdot (CO_3) \cdot 4H_2O$.

Among them, in particular, in the present invention, a Mg—Al-based hydrotalcite compound represented by equation 2 in view of gas generation prevention is preferable,

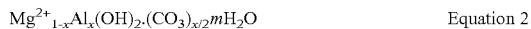

$$Mg^{2+}_{1-x}Al_x(OH)_2 \cdot (CO_3)_{x/2} mH_2O \qquad \text{Equation 2}$$

wherein, x and m are values satisfying $0<x<0.5$ and $0\leqq m\leqq 2$.

The blending quantity of the hydrotalcites compound (D) is 0.1 to 1.0% by mass in the heat-resistant resin composition and is preferably 0.01 to 5 parts by mass and more preferably 0.1 to 2 parts by mass with respect to 100 parts by mass of the total quantity of the PAS resin (A) and the aromatic polyamide (B), from the point of proving superior gas generation prevention effect.

The heat-resistant resin composition of the present invention includes the PAS resin (A) and the aromatic polyamide (B) having terephthalic acid amide as the essential structural unit. It is preferable that the epoxy-based silane coupling agent (C) be further blended, more preferably, a fiber reinforcing material (E-1) or an inorganic filler (E-2) be further blended in view of the mechanical strength of the molded article.

Examples of the fiber reinforcing material (E-1) may include an inorganic fiber material such as, glass fiber, PAN-based or pitch-based carbon fiber, silica fiber, silica/alumina fiber, zirconia fiber, boron nitride fiber, silicon nitride fiber, boron fiber, aluminium borate fiber, potassium titanate fiber, and metal fiber material of stainless steel, aluminum, titanium, copper and brass; and an organic fiber material such as aramid fiber.

Examples of the inorganic filler (E-2) may include silicate such as mica, talc, wollastonite, sericite, kaolin, clay, bentonite, asbestos, alumina silica, zeolite or pyrophyllite; carbonate such as calcium carbonate, magnesium carbonate or dolomite; sulfate such as calcium sulfate or barium sulfate; metal oxide such as alumina, magnesium oxide, silica, zirconia, titania or iron oxide; glass beads; ceramic beads; boron nitride; silicon carbide; and calcium phosphate. As the fiber reinforcing material (E-1) and the inorganic filler (E-2), one of or two or more of the materials may be used.

The blending quantity of the fiber reinforcing material (E-1) or the inorganic filler (E-2) used in the present invention is in a range of 1 to 200 parts by weight and more preferably in a range of 20 to 120 parts by mass, with respect to the 100 parts by mass of the total quantity of the PAS resin (A) and the aromatic polyamide (B). The fiber reinforcing material (E-1) or the inorganic filler (E-2) may be subjected to a surface treatment by a surface-treating agent such as a silane coupling agent or a titanium coupling agent in a range in which the performance of the heat-resistant resin-molded article does not deteriorate.

In addition, an antioxidizing agent, a processing-heat stabilizer, a plasticizing agent, a mold release agent a coloring agent, a lubricant agent, a weathering resistant stabilizer, a foaming agent, a corrosion inhibitor, and a wax may be suitably added to the heat-resistant resin composition of the present invention without lowering the effect of the present invention.

Other resin components may be suitably blended into the heat-resistant resin composition of the present invention according to the required characteristics. The resin components which can be used herein include a homopolymer or copolymer of a monomer such as ethylene, butylene, pentene, butadiene, isoprene, chloroprene, styrene, α-methylstyrene, vinyl acetate, vinyl chloride, acrylic acid ester, methacrylic acid ester and (metha)acrylic nitrile; a homopolymer, a random copolymer, a block copolymer or a graft copolymer such as polyurethane, polyester, polyester of polybutylene terephthalate/polyethylene terephthalate, polyacetal, polycarbonate, polysulfone, polyarylsulfone, polyethersulfone, polyphenylene ether, polyetherketone, polyetheretherketone, polyimide, polyamideimide, silicon resin, epoxy resin, phenoxy resin, liquid crystal polymer, and polyarylether.

The production method of the heat-resistant resin composition includes a method including uniformly mixing the PAS resin (A), the aromatic polyamide (B) having the terephthalate as the essential structural unit and, if necessary, other blended components by a tumbler or a Henschel mixer, putting the components into a twin screw extruder, and melting and kneading the components under the condition that a ratio of an ejection quantity (kg/hr) of the resin component to the screw rotation rate (rpm) (ejection quantity/screw rotation rate) is 0.02 to 0.2 (kg/hr/rpm). When the heat-resistant resin composition is produced under this condition, the average diameter of the aromatic polyamide (B) which is micro-dispersed by the PAS resin (A) as matrix may be adjusted to 0.1 to 1.0 µm.

In detail, one example of the production method is a method of putting the components into the twin screw extruder and melting and kneading the components under the condition of a setting temperature of 330° C. and a resin temperature of 350° C. At this time, the ejection quantity of the resin component is in a range of 5 to 50 kg/hr at a rotation rate of 250 rpm. In particular, the ejection quantity is preferably in a range of 20 to 35 kg/hr in view of dispersion. Accordingly, in particular, the ratio of the ejection quantity (kg/hr) of the resin component to the screw rotation rate (rpm) (section quantity/screw rotation rate) is preferably 0.08 to 0.14 (kg/hr/rpm). In the torque of the twin screw extruder, it is preferable that a maximum torque be in a range of 20 to 100 (A) and more preferable in a range of 25 to 80 (A) because the dispersion of the aromatic polyamide (B) is improved.

Among the blended components, it is preferable that the fiber reinforcing material (E-1) be put from the side feeder of the twin-screw extruder into the extruder, because the dispersion of the fiber reinforcing material (E-1) is improved. In the position of the side feeder, a ratio of a distance from the extruder resin insertion portion to the side feeder to the total length of the screw of the twin-screw extruder is preferably 0.1 to 0.6 and more preferably 0.2 to 0.4.

The kneaded heat-resistant resin composition is obtained as a pellet and, subsequently, is transferred to a molding machine so as to be melted and molded, thereby obtaining a desired molded article.

The method of melting and molding the composition includes, for example, injection molding, extruding molding, and compression molding. Among them, the injection molding is preferable as the molding for the surface mount electronic component.

The obtained molded article which includes the heat-resistant resin composition containing the polyarylene sulfide resin (A) and the aromatic polyamide (3) having terephthalic acid amide as the essential structural unit at a former/latter ratio of 70/30 to 95/5 by mass and in which, when a broken-out section of a molded article composed of the heat-resistant resin composition is etched with an organic solvent and subsequently observed on a scanning electron microscope (2,500 times), an average diameter of holes formed by the etching process is in a range of 0.1 to 1.0 µm, can be used as a soldered molded article because heat resistance is excellent and elasticity modulus of a high-temperature range is high. In particular, as described above, in the use of the surface mount electronic component, the surface temperature of the substrate in the heating furnace (reflow furnance) becomes a high temperature of 280° C. or more. Thus, although melting or deformation is caused in the conventional PAS resin, the above-mentioned molded article can be soldered to the substrate without causing melting or deformation. The surface temperature of the substrate is the temperature of the surface of the substrate measured actually in the soldering process of the surface mounting. The specific example of the substrate includes a printed wiring board or circuit board in the SMT method.

The heating method using the heating furnance (reflow furnace) in the surface mount method includes (1) a thermal conduction method of loading and heating a board on a heat-resistant belt which moves on a heater, (2) a vapor phase soldering (VPS) method of using latent heat yielded at the time of aggregation of fluorine-based liquid having a boiling point of about 220° C., (3) a hot-air convection thermal conduction method of passing the board through a place where hot air is forcedly circulated, (4) an infrared ray method of heating the board at the upper side or the upper and lower sides of the board by infrared ray, and (5) a method of using a combination of hot-air heating and infrared-ray heating.

The molded article composed of the heat-resistant resin composition of the present invention can be used in various fields such as precision parts, various types of electro/electronic components, mechanical parts, vehicle parts, architecture, sanitary, sports and general merchandise and can be more particularly used as the surface mount electronic component as described above, due to excellent flame retardancy, heat resistance, and rigidity.

The surface mount electronic component of the present invention, which includes the molded article of the heat-resistant resin composition and a metal terminal as essential components, is fixed on the printed wiring board or circuit board by the surface mount method. In order to fix this electronic component on the board by the surface mount method, the metal terminal of the electronic component is loaded on the surface of the substrate so as to be connected to a conduction portion of the board via a soldering ball, and then the board is heated in the reflow furnace by the above-described heating method, and the electronic component is soldered to the board.

Examples of the surface mount electronic component may include a connector, a switch, a sensor, a resistor, a relay, a capacitor, a socket, a jack, a fuse holder, a coil bobbin, a housing of an IC or an LED, and the like, for the surface mount method.

The heat-resistant resin-molded article obtained by the production method of the present invention realizes high flame retardancy corresponding to V-0 in UL flame resistance test standard UL-94 (Underwriters Laboratories Inc. (UL) standard No. 94) without adding a flame retarder such as so-called halogen-based copper, antimony oxide, or metallic hydroxide.

EXAMPLES

Hereinafter, the present invention will be described in more detail with reference to Examples.

Examples 1 to 9 and Comparative Examples 1 to 5

The polyarylene sulfide resin, the aromatic polyamide resin, and other blended materials (except for glass fiber chopped strand) were uniformly mixed by tumbling according to the blending ratio described in Tables 1 and 2. Thereafter, the blended material was put into a twin-screw extruder "TEM-35B" (manufactured by Toshiba Machine Co., Ltd.) from a vent and a pellet was obtained by melting and kneading the blended material under a resin component ejection quantity of 25 kg/hr, a screw rotation rate of 250 rpm, a ratio of the resin component ejection quantity (kg/hr) and the rotation rate (rpm) (ejection quantity/screw rotation rate) of 0.1 (kg/hr/rpm), a maximum torque of 65 (A) and a setting resin temperature of 330° C., while supplying the glass fiber chopped strands having a fiber diameter of 10 µm and a length of 3 mm from the side feeder (a ratio of a distance from the resin insertion portion to the side feeder to the total length of the screw is 0.28) with a ratio of 40 parts by mass with respect to 60 parts by mass of the above-mentioned blended material.

Subsequently, the following evaluation experiments were performed using the pellet

[Etching Process and Measurement of Average Diameter]

The pellet of the resin composition was molded using an injection molding machine and a test piece having a width of 12 mm, a length of 62.5 mm and a thickness of 3 mm was obtained. This was cooled to −40° C. and an Izod impact test was performed in accordance with ASTM E-256, thereby breaking out the test piece. The broken-out section of the test piece was immersed in trifluoroacetic acid under the condition of a temperature of 20° C. and was treated by ultrasonics, and a micro-particle of aromatic polyamide, which exists on the broken-out section, was removed. Subsequently, the broken-out section was washed with acetone and then dried for 30 minutes.

Two areas of the broken-out section of the molded article which had been subjected to the etching process were photographed using a scanning electron microscope (2,500 times), the micrographs were enlarged to an A3 size, and, in the enlarged micrographs, the diameters of all holes observed in a range of 2600 μm$^2$ were measured using a graphic digitizer "KD4600" manufctured by GRAPHTEC Corporation and the average of the two areas was calculated.

The result is shown in Tables 1 and 2.

Figure 2:
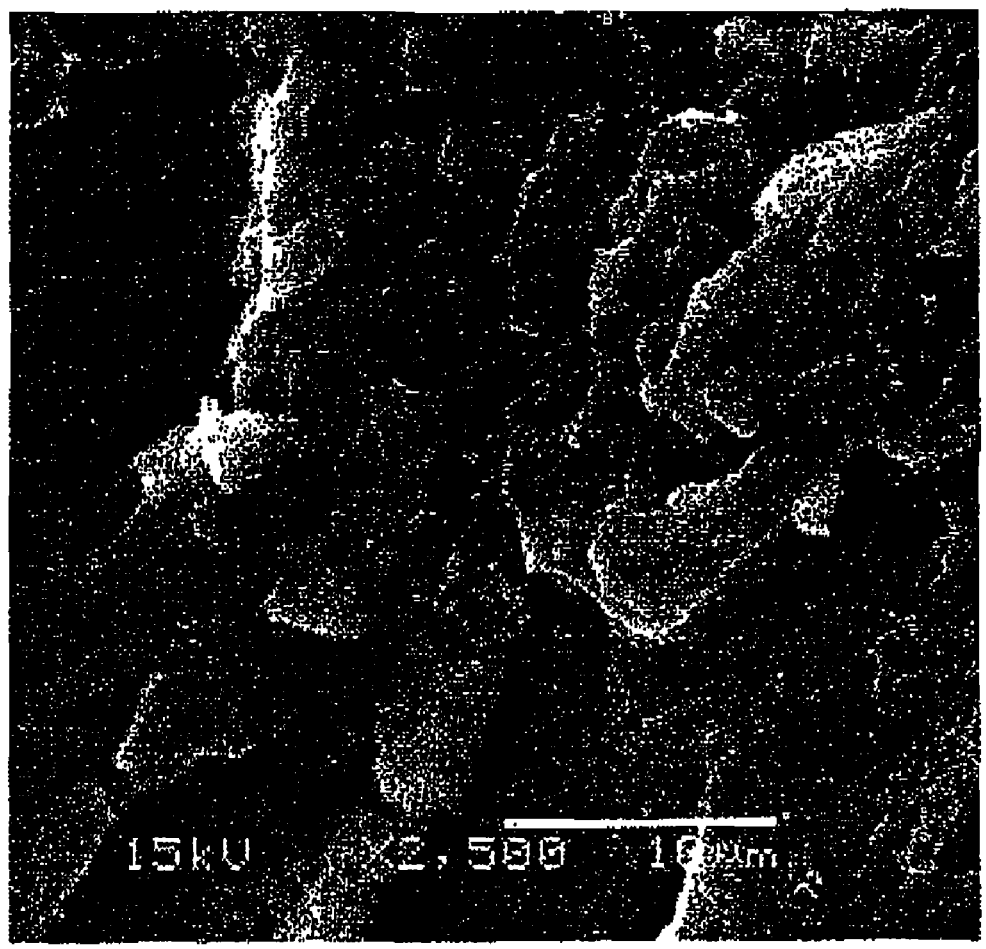
FIG. 2 is a scanning electron micrograph of Example 8 (2,500 times).
Figure 3:
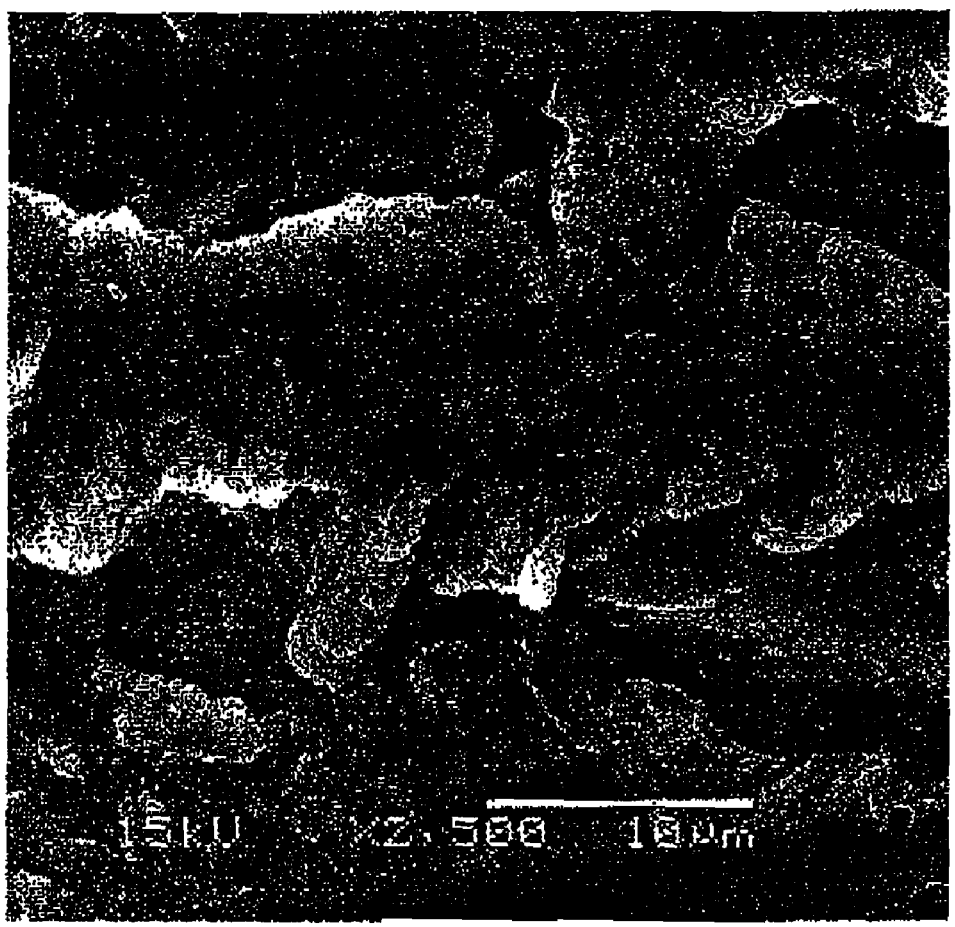
FIG. 3 is a scanning electron micrograph of Example 9 (2,500 times).
Figure 4:
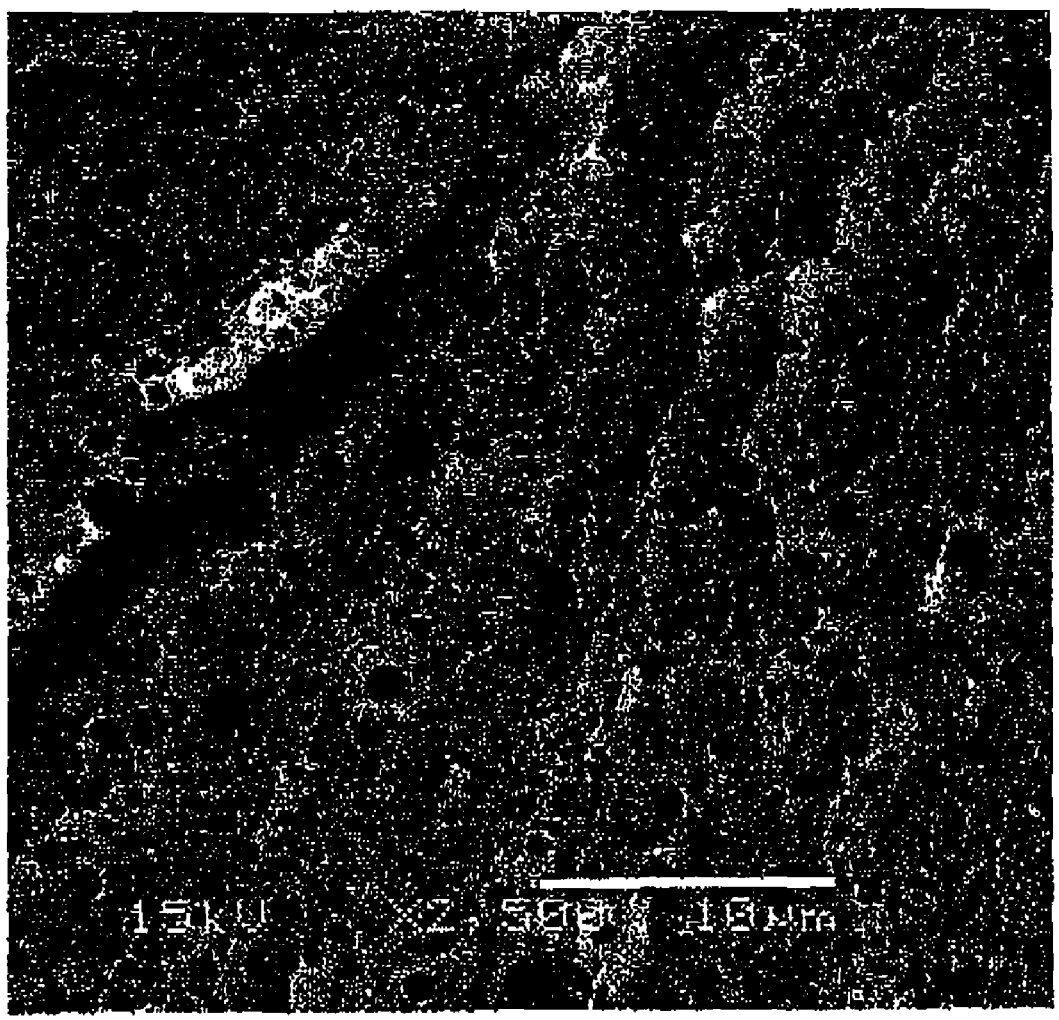
FIG. 4 is a scanning electron micrograph of Comparative Example 2 (2,500 times).

The scanning electron micrograph of Example 8 is shown in FIG. 2, the scanning electron micrograph of Example 9 is shown in FIG. 3, and the scanning electron micrograph of Comparative Example 2 is shown in FIG. 4.

[Flexural Strength and Flexural Break elongation after Soldering Reflow Heating]

The pellet of the resin composition was molded using an injection molding machine and a test piece having a width of 10 mm, a length of 50 mm and a thickness of 1.6 mm was obtained. Subsequently, the flexural strength and flexural break elongation after soldering reflow heating were measured in accordance with ASTM D790 with respect to this test piece. The reflow heating was performed using an infrared ray reflow device (a product "TPF-2" manufactured by Asahi Engineering Co., Ltd.). In the heating condition, a pre-heating process was performed at 180° C. for 100 seconds and the heating process was maintained until the surface of the base reached 280° C. That is, a temperature profile (temperature curve) was set in the reflow device and the heating process was maintained at the range of 200° C. or more for 100 seconds, at the range of 220° C. or more for 90 seconds, at the range of 240° C. or more for 80 seconds and at the range of 260° C. or more for 60 seconds.

[Blister Resistance Test A]

The pellet of the resin composition was molded using an injection molding machine and a box type connector having a vertical length of 70 mm, a horizontal length of 10 mm, a height of 8 mm and a thickness of 0.8 mm was obtained. Subsequently, this box connector was loaded on the printed board and was heated under the same reflow condition as the above-mentioned test "Flexural Strength and Flexural Break elongation after Soldering Reflow Heating. The appearance thereof was evaluated on the basis of the following two steps by observing the box connector after heating by the naked eye.

A: Appearance was not changed. B: Blister or melting was observed.

[Blistering Resistance Test B]

The pellet of the resin composition was molded using an injection molding machine and a box type connector having a vertical length of 50 mm, a horizontal length of 10 mm, a height of 8 mm and a thickness of 0.8 mm was obtained. Subsequently, this box connector was subjected to the reflow process according to the temperature profile shown in FIG. 1 using an infrared heating furnace (manufactured by Sanyo Seiko Co., Ltd.: SMT Scope). The appearance thereof was evaluated on the basis of the following two steps by observing the box connector after heating by the naked eye.

A: Appearance was not changed. B: Blister or melting was observed.

[Burning Test]: Performed on the basis of a UL-94 vertical test.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Blending Composition (parts by weight) | PPS1 | 41.3 | 50.2 | — | — | — | — | — | — | — |
| | PPS2 | — | — | 84.6 | 41.7 | 50.6 | 53.6 | 41.0 | 49.7 | 49.2 |
| | PA6T | 17.7 | 8.8 | 14.9 | 17.8 | 8.9 | 5.9 | 17.5 | 8.8 | 8.8 |
| | Hydrotalcite | — | — | — | — | — | — | — | — | 0.5 |
| | Epoxysilane | — | — | 0.5 | 0.5 | 0.5 | 0.5 | 0.5 | 0.5 | 0.5 |
| | ADD-1 | 0.5 | 0.5 | — | — | — | — | 0.5 | 0.5 | 0.5 |
| | ADD-2 | 0.5 | 0.5 | — | — | — | — | 0.5 | 0.5 | 0.5 |
| | GF | 40 | 40 | — | 40.0 | 40.0 | 40.0 | 40.0 | 40.0 | 40.0 |
| Flexural Strength (MPa) | Before Reflow Heating | 260 | 260 | 180 | 290 | 290 | 295 | 290 | 290 | 290 |
| | After Reflow Heating | 260 | 260 | 180 | 290 | 290 | 295 | 290 | 290 | 290 |
| Flexural Break elongation (MPa) | Before Reflow Heating | 2.3 | 2.4 | 50 | 2.3 | 2.4 | 2.4 | 2.3 | 2.4 | 2.4 |
| | After Reflow Heating | 2.3 | 2.4 | 50 | 2.3 | 2.4 | 2.4 | 2.3 | 2.4 | 2.4 |
| Blistering Resistance Test A | | A | A | — | — | — | — | — | — | — |
| Blistering Resistance Test B | | — | — | A | A | A | A | A | A | A |
| Flame Retardancy | | V-0 | V-0 | V-0 | V-0 | V-0 | V-0 | V-0 | V-0 | V-0 |
| Absorption Ratio (%) | | 0.06 | 0.05 | 0.02 | 0.06 | 0.05 | 0.04 | 0.06 | 0.05 | 0.05 |
| Average Diameter [μm] | | 0.7 | 0.5 | 0.5 | 0.4 | 0.2 | 0.2 | 0.4 | 0.2 | 0.2 |

TABLE 2

| | | Comparative Examples | | | | |
|---|---|---|---|---|---|---|
| | | 1 | 2 | 3 | 4 | 5 |
| Blending Composition (parts by mass) | PPS1 | 29.5 | 35.4 | 23.6 | — | — |
| | PPS2 | — | — | — | 35.1 | 23.4 |
| | PA6T | 29.5 | 23.6 | 35.4 | 23.4 | 35.1 |
| | Hydrotalcite | — | — | — | — | — |
| | Epoxysilane | — | — | — | 0.5 | 0.5 |

TABLE 2-continued

|  |  | Comparative Examples |  |  |  |  |
|---|---|---|---|---|---|---|
|  |  | 1 | 2 | 3 | 4 | 5 |
|  | ADD-1 | 0.5 | 0.5 | 0.5 | 0.5 | 0.5 |
|  | ADD-2 | 0.5 | 0.5 | 0.5 | 0.5 | 0.5 |
|  | GF | 40 | 40 | 40 | 40.0 | 40.0 |
| Flexural Strength (MPa) | Before Reflow Heating | 260 | 260 | 260 | 290 | 290 |
|  | After Reflow Heating | 260 | 260 | 260 | 290 | 290 |
| Flexural Break elongation (MPa) | Before Reflow Heating | 1.9 | 1.9 | 1.9 | 1.9 | 1.9 |
|  | After Reflow Heating | 1.9 | 1.9 | 1.9 | 1.9 | 1.9 |
| Blistering Resistance Test A |  | A | A | A | — | — |
| Blistering Resistance Test B |  | — | — | — | B | B |
| Flame Retardancy |  | V-2 | V-2 | HB | V-2 | HB |
| Absorption Ratio (%) |  | 1.3 | 1.0 | 1.5 | 1.0 | 1.5 |
| Average Diameter [μm] |  | 1.6 | 1.2 | Observation impossible | 1.2 | Observation impossible |

The blended resins and materials of Tables 1 and 2 are as follows and "Observation impossible" of Table 2 indicates that the aromatic polyamide does not show a particle shape.

PPS1: Linear PSS "DSP LR-30" (non-Newtonian index of 1.2) manufactured by Dainippon Ink and Chemicals, Incorporated PPS2: Polyphenylene sulfide resin obtained by mixing linear PPS "LR-100G" (non-Newtonian index of 1.1) manufactured by Dainippon Ink and Chemicals, Incorporated and branched PSS "LT-10G" (non-Newtonian index of 1.5) manufactured by Daiippon Ink and Chemicals, Incorporated with a former/latter=80/20(mass ratio) (viscosity: melt flow rate of 50 g/10 minutes and non-Newtonian index of the mixture of 1,2)

PA6T: Aromatic polyamide (melting point of 310° C. and Tg of 120°(C) obtained by reacting 65 to 70% by mole of terephtalate acid of "AMODEL A-1004" manufactured by Solvay Advanced Polymers Corporation, isophthalic acid and hexamethylenediamine as an essential monomer component Epoxysilane: γ-glycidoxypropyltrimethoxysilane ADD-1: Hindered phenol-based antioxidizing agent "IRGANOX 1098" manufactured by Chiba Specialty Chemicals Co., Ltd.

ADD-2: Phosphor-based processing-heat stabilizer "IRGAFOS 168" manufactured by Chiba Specialty Chemicals Co., Ltd.

GF: Glass fiber Chopped Strands (fiber diameter of 10 μm and length of 3 mm)

INDUSTRIAL APPLICABILITY

According to the present invention, it is possible to provide a heat-resistant resin composition which has excellent heat resistance, does not show a reduced mechanical strength such as flexural strength even after being passed through a reflow furnace and heat-treated under high temperature conditions, and also has an excellent flame retardancy, a production method of the heat-resistant resin composition, a heat-resistant resin-molded article, and a surface mount electronic component.

Accordingly, the heat-resistant resin composition of the present invention shows an excellent heat resistance in a high-temperature range and, when the heat-resistant resin composition is used in the surface mount electronic component a variation in mechanical strength and a variation in appearance of the electronic component after a soldering process are very small despite being exposed to a high temperature at the time of soldering to the base. Accordingly, the heat-resistant resin composition is particularly used in a connector, a switch, a relay, a coil bobbin and a capacitor which are provided at the time of the soldering to the printed board in the SMT method.

The invention claimed is:

1. A heat-resistant resin composition comprising:
a polyarylene sulfide resin (A) having a non-Newtonian index of 1.3 to 0.9; and;
an aromatic polyamide (B) having terephthalic acid amide as an essential structural unit,
wherein the aromatic polyamide (B) comprises a terephthalate amide structure represented by following Structural Formula a:

Structural Formula a

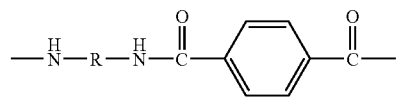

wherein R is an alkylene group having 2 to 12 carbon atoms,
wherein a content of the terephthalate amide structure is 65% by mole or more with respect to a total acid amide structural unit constituting the aromatic polyamide (B);
a ratio [(A)/(B)] of the polyarylene sulfide resin (A) to the aromatic polyamide (B) is 70/30 to 95/5 by mass;
the aromatic polyamide (B) is particulately dispersed in the polyarylene sulfide resin (A) as a matrix, and
an average diameter of particles of the aromatic polyamide (B) is in a range of 0.1 to 1.0 μm.

2. The heat-resistant resin composition according to claim 1, further comprising an epoxy-based silane coupling agent (C).

3. The heat-resistant resin composition according to claim 2, further comprising a hydrotalcites compound (D).

4. The heat-resistant resin composition according to claim 1, wherein, when a broken-out section of a molded article composed of the heat-resistant resin composition is etched with an organic solvent and subsequently observed on a scanning electron microscope at 2,500 times, the average diameter of particles of the aromatic polyamide (B) is obtained by calculating an average diameter of holes formed by the etching process and considering the average diameter of the holes as the average diameter of the particles.

5. The heat-resistant resin composition according to claim 1, further comprising a fiber reinforcing material (E-1) or an inorganic filler (E-2).

6. A surface mount electronic component, comprising: a molded article of the heat-resistant resin composition according to claim 1; and a metal terminal.

7. A method of producing a heat-resistant resin composition, comprising the steps of:
inserting a polyarylene sulfide resin (A) having a non-Newtonian index of 1.3 to 0.9 and an aromatic polyamide (B) having terephthalic acid amide as an essential structural unit into a twin-screw extruder; and
melting and kneading the polyarylene sulfide resin (A) and the aromatic polyamide (B) under the condition that a ratio of an ejection quantity, in kg/hr, of a resin component to a screw rotation rate in rpm, ejection quantity/screw rotation rate, of 0.02 to 0.2 kg/hr/rpm, wherein the aromatic polyamide (B) comprises a terephthalate amide structure represented by following Structural Formula a:

Structural Formula a

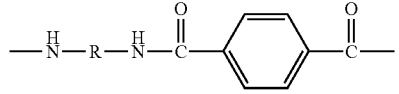

wherein R is an alkylene group having 2 to 12 carbon atoms, wherein a content of the terephthalate amide structure is 65% by mole or more with respect to a total acid amide structural unit constituting the aromatic polyamide (B).

8. The method according to claim 7, wherein an epoxy-based silane coupling agent (C) is melted and kneaded together with the components (A) and (B).

9. The method according to claim 8, wherein a hydrotalcites compound (D) is melted and kneaded together with the components (A) to (C).

10. The method according to claim 7, wherein a maximum torque of the extruder is 20 to 100 N-m.

11. The method according to claim 7, further comprising the step of inserting a fiber reinforcing material (E-1) or an inorganic filler (E-2) into the twin-screw extruder from a side feeder.

12. A heat-resistant resin-molded article comprising a heat-resistant resin composition, wherein the heat-resistant resin composition comprises:

a polyarylene sulfide resin (A) having a non-Newtonian index of 1.3 to 0.9; and an aromatic polyamide (B) having terephthalic acid amide as an essential structural unit, wherein the aromatic polyamide (B) comprises a terephthalate amide structure represented by Structural Formula a:

Structural Formula a

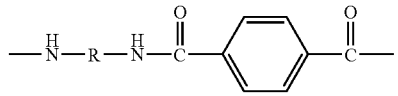

wherein R is an alkylene group having 2 to 12 carbon atoms, wherein a content of the terephthalate amide structure is 65% by mole or more with respect to a total acid amide structural unit constituting the aromatic polyamide (B):

a ratio [(A)/(B)] of the polyarylene sulfide resin (A) to the aromatic polyamide (B) is 70/30 to 95/5 by mass, and when a broken-out section of a molded article composed of the heat-resistant resin composition is etched with an organic solvent and subsequently observed on a scanning electron microscope at 2,500 times, an average diameter of holes formed by the etching process is in a range of 0.1 to 1.0 μm.

* * * * *